United States Patent [19]

Pedersen et al.

[11] Patent Number: 4,543,281

[45] Date of Patent: Sep. 24, 1985

[54] FIRE OR FLAME BARRIER MATERIAL

[75] Inventors: Narve S. Pedersen; Wilfred L. Persson; Jan Hordvik; Arvid Kristiansen, all of Drammen, Norway

[73] Assignee: A/S Norsk Kabelfabrik, Norway

[21] Appl. No.: 550,029

[22] Filed: Nov. 8, 1983

Related U.S. Application Data

[63] Continuation-in-part of Ser. No. 472,254, Mar. 4, 1983, abandoned, which is a continuation-in-part of Ser. No. 451,833, Dec. 21, 1982, abandoned.

[30] Foreign Application Priority Data

May 7, 1982 [NO] Norway .................................. 821503
Sep. 17, 1982 [NO] Norway .................................. 823151

[51] Int. Cl.$^4$ ................................................. B32B 7/00
[52] U.S. Cl. .................................... 428/36; 106/18.11; 252/2; 252/7; 252/606; 264/142; 428/921
[58] Field of Search ....................... 428/921, 36; 252/2, 252/7, 606; 106/18.11, 18.12, 18.29; 264/118, 141, 142, 143

[56] References Cited

U.S. PATENT DOCUMENTS

| | | | |
|---|---|---|---|
| 3,707,385 | 12/1972 | Kraemer et al. | 106/18.11 |
| 3,865,760 | 2/1975 | Pitts et al. | 428/921 |
| 4,069,288 | 1/1978 | Barkhuff, Jr. et al. | 264/143 |
| 4,076,580 | 2/1978 | Panusch et al. | 428/921 |
| 4,130,458 | 12/1978 | Moore et al. | 428/921 |
| 4,250,220 | 2/1981 | Schlatter et al. | 106/18.11 |
| 4,273,821 | 6/1981 | Pedlow | 428/921 |

Primary Examiner—John E. Kittle
Attorney, Agent, or Firm—Cushman, Darby & Cushman

[57] ABSTRACT

A fire or flame barrier material comprising an ethylene copolymer matrix, 150–220 parts by weight of aluminum hydroxide and 150–220 parts by weight of calcium carbonate or calcium-magnesium carbonate. The material can also include a lubricating agent, an elasticizer, calcium oxide, a polymer softening agent, a color-aging agent, and an antioxidant agent.

17 Claims, 5 Drawing Figures

EQUIPMENT USED FOR THE CONTROL OF THE THERMAL STABILITY OF PRODUCTS A,C, AND P

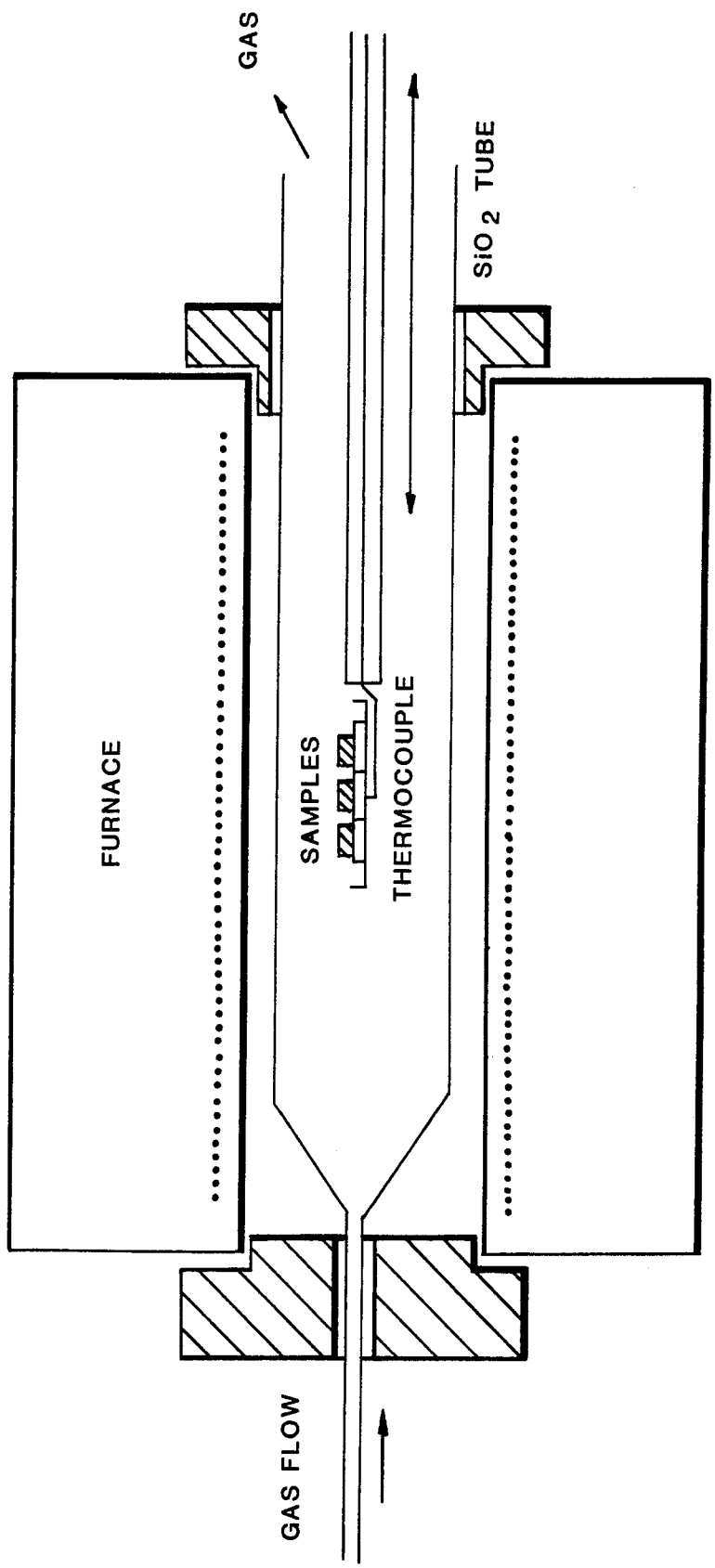
FIG. 1 EQUIPMENT USED FOR THE CONTROL OF THE THERMAL STABILITY OF PRODUCTS A,C, AND P

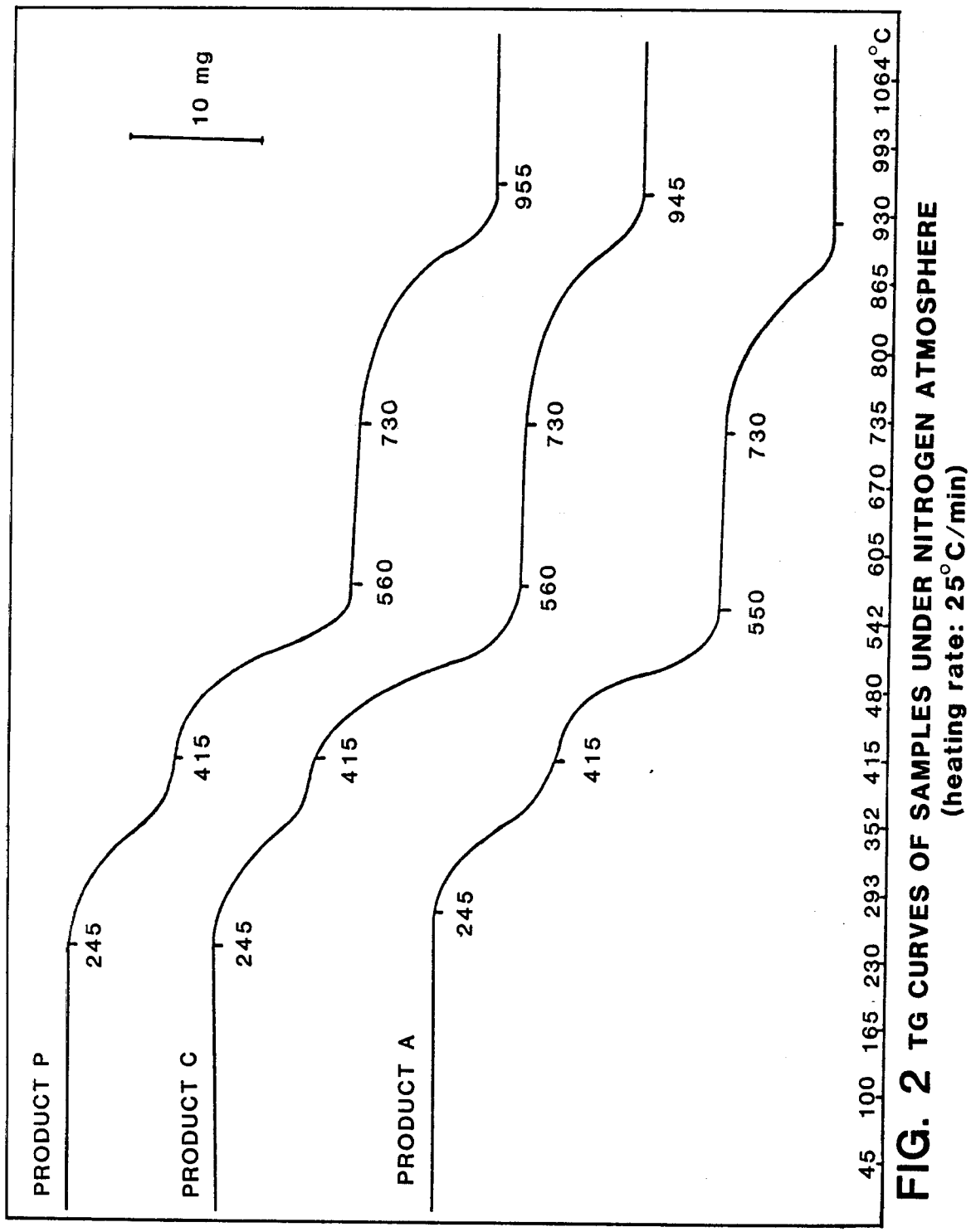
FIG. 2 TG CURVES OF SAMPLES UNDER NITROGEN ATMOSPHERE (heating rate: 25° C/min)

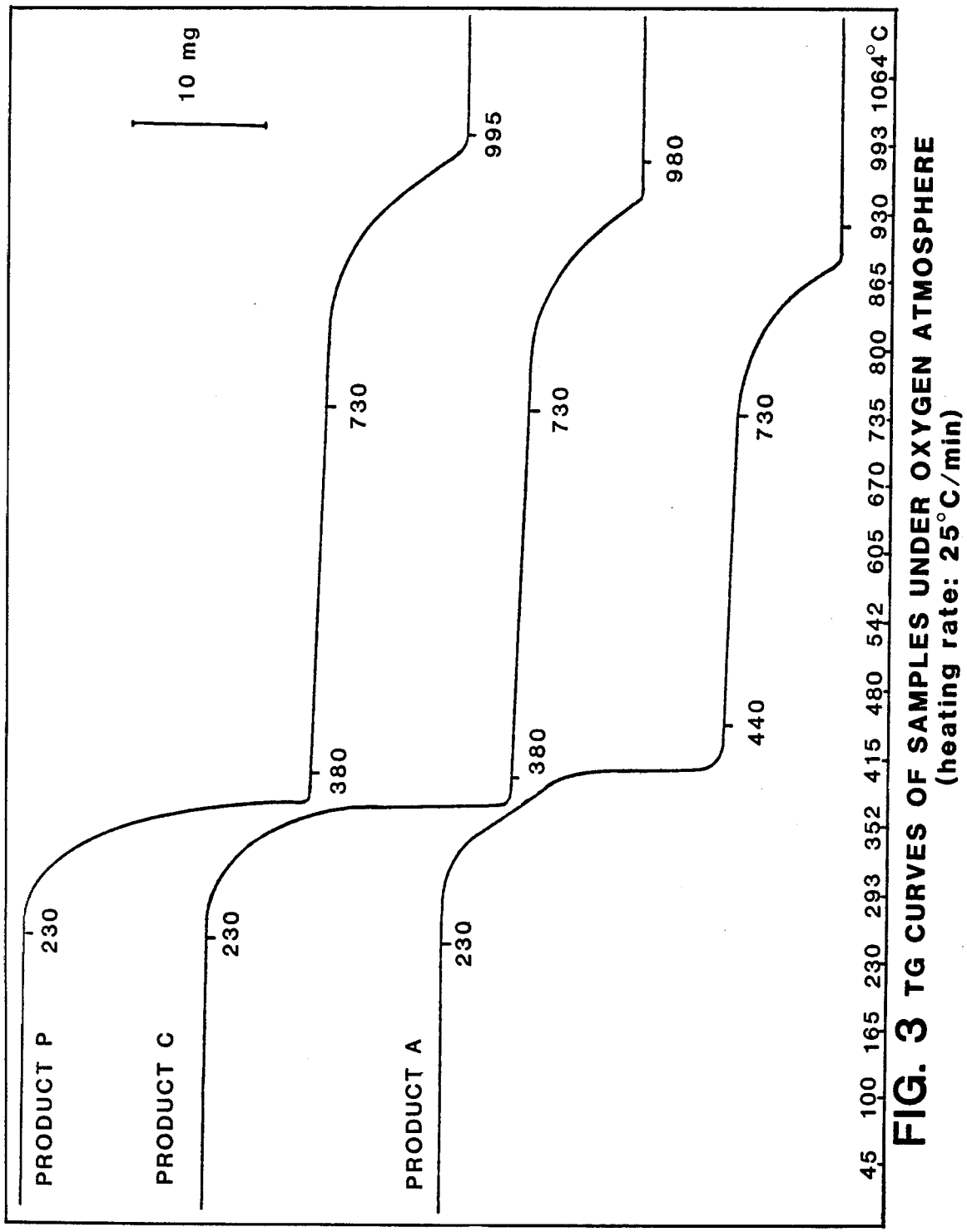
FIG. 3 TG CURVES OF SAMPLES UNDER OXYGEN ATMOSPHERE (heating rate: 25°C/min)

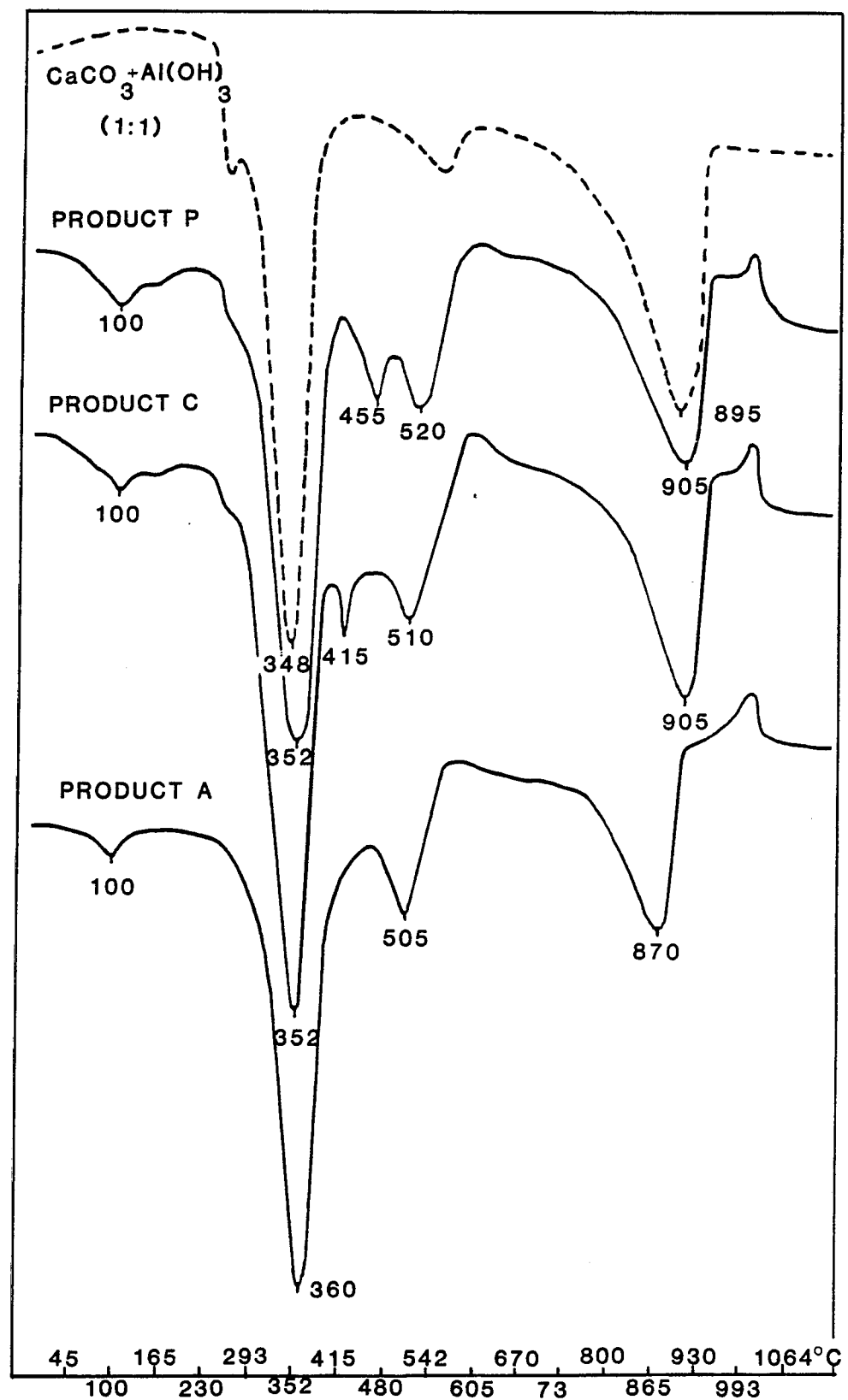
FIG. 4 DTA CURVES OF SAMPLES UNDER NITROGEN ATMOSPHERE (heating rate: 25°C/min)

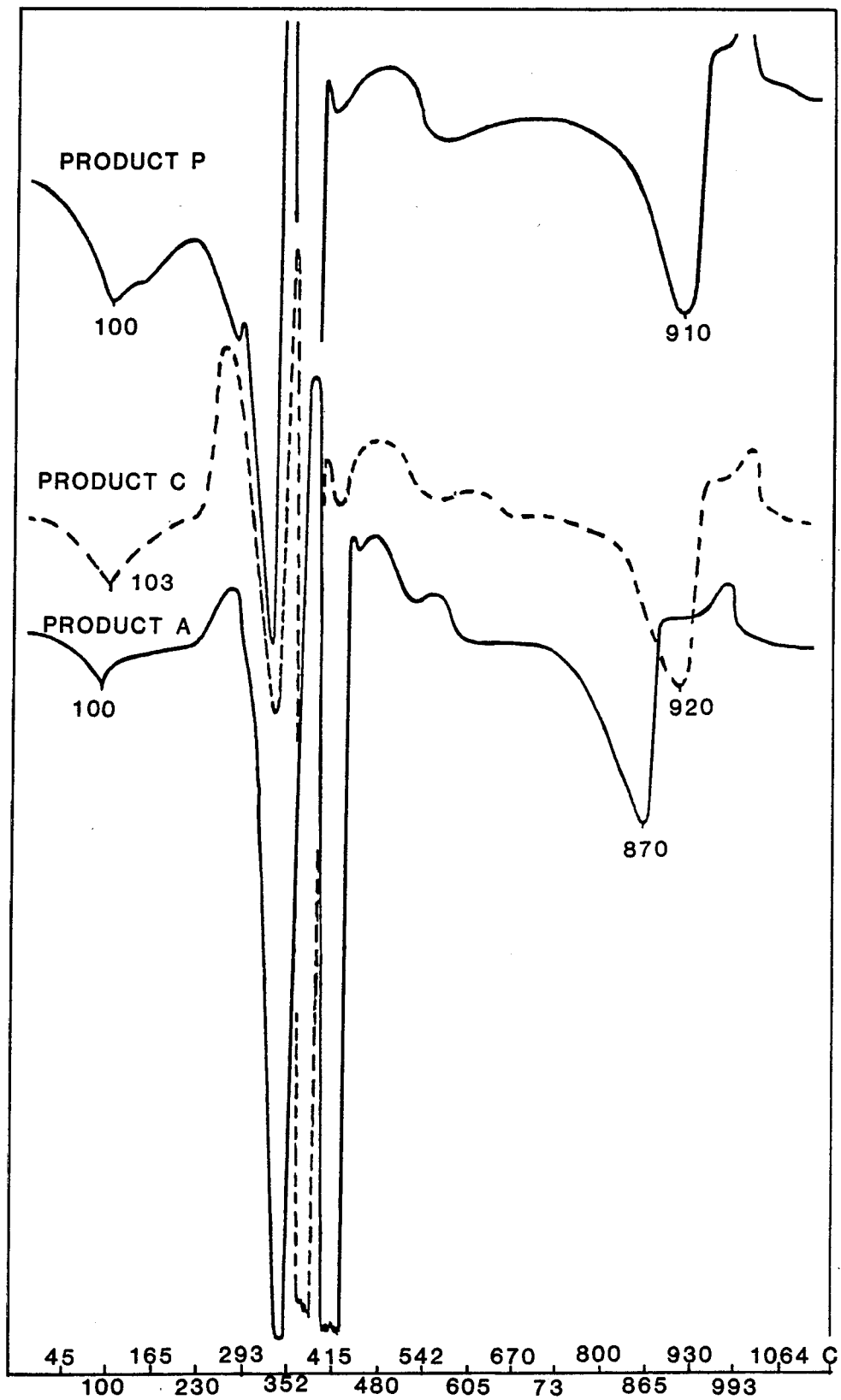
FIG. 5 DTA CURVES OF SAMPLES UNDER OXYGEN ATMOSPHERE (heating rate: 25°C/min)

FIRE OR FLAME BARRIER MATERIAL

This application is a continuation-in-part of our application Ser. No. 472,254, filed Mar. 4, 1983 which in turn is a continuation-in-part of our application Ser. No. 451,833, filed on Dec. 21, 1982, now both abandoned.

The present invention relates to a fire or flame barrier material and more particularly, to a high temperature, heat barrier material having selective, thermoprotective properties at elevated temperatures.

BACKGROUND OF THE INVENTION

Heretofore, various materials have been proposed as flame or fire retardants. For instance, in the field of fire resistant cable transits, such materials based on neoprenes, silicon foam, inorganic molding materials and mineral wool mats have been utilized. While these known materials exhibit various useful insulation and resistance to fire hazzard properties, none of them, simultaneously, exhibits (1) good thermal conductivity under normal use conditions, (2) expansion and plugging properties at elevated temperatures and (3) heat insulating and mechanical protective properties at very high temperatures, such as are encountered during a fire.

The present invention, however, is directed to a fire or flame barrier material which, in addition to exhibiting the above-mentioned characteristics, also has, simultaneously, additional operational and flame or fire resistant properties, and is capable of being produced using relatively inexpensive processes and components.

GENERAL DESCRIPTION OF THE INVENTION

When exposed to fire or elevated temperatures the fire or flame barrier material of the present invention exhibits two basic properties which together provide an active heat barrier thereby protecting objects requiring protection:

(1) When heated to certain elevated temperatures, foaming and an endothermic reaction occur. One of the by-products of this endothermic reaction is water which, in the course of evaporating, delays the heat rise at the heat exposed surface and acts as a foaming agent; and (2) the material of the present invention, when directly exposed to elevated temperatures is transformed into an intumescent polymeric foam like layer having a firm, ceramic-like structure. This intumescent layer shields the remaining non-exposed portion of the thermoprotective material and has good heat insulating properties at temperatures up to 2300° F. and higher.

The heat barrier properties of the material of the present invention are present only at temperatures above 200° C. At temperatures above 200° C., the polymeric matrix component of the material begins to swell and forms a porous, thermal insulating material. Simultaneously, water vapor is given off which delays a temperature increase and which contributes to a build-up of a non-combustible atmosphere around the material of the present invention.

During this swelling period it has been observed that the material of the present invention swells approximately 30–40 percent on a linear basis (e.g. >100% on a volume basis).

Below 200° C., the material of the present invention is a relatively good heat conductor, thereby dissipating excess heat. During heat exposure the material softens at a temperature of about 95° C. Because its melt viscosity is so high, non-loaded specimens maintain their shape during heating, swelling and eventually sintering. It has also been observed that the material of the present invention does not drip during softening and burning stages.

The fire or flame barrier material of the present invention, broadly, is a highly filled polymer based composite, the principal components of which are an ethylene copolymer, aluminum hydroxide, i.e. $Al(OH)_3$ and calcium carbonate. This fire or flame barrier material is, as extruded or molded, or coated at ambient temperature a solid having well defined physical and chemcial properties. On heating the fire or flame barrier material of the present invention from ambient temperature to a temperature of about 1200° C., the material undergoes a series of complex chemical and physical transformations. On cooling the flame barrier material of the present invention from an appropriately high temperatures to which it has been subjected, the cooled material can be characterized as a porous, mechanically solid and mainly inorganic mass. It has been observed that the thermal conductivity of the material during this heating-cooling operation is reduced to one-tenth of its thermal conductivity in the virgin state.

It has also been observed that the heat barrier effect of the material of the present invention is highly complex. The sequence of changes that the material undergoes can best be described by observing the process when a slab of the fire or flame barrier material of the invention is heated on one side thereof with a high input heat source of about 1200° C.

Under these conditions, the fire or flame barrier material begins to soften at the surface directly exposed or in contact with the said heat source. As the temperature of the said surface increases to about 200° C. a gradual increase in surface softness occurs and the temperature front moves relatively rapidly into the polymeric matrix due to its relatively high thermal conductivity. The ethylene copolymer does not truly melt but rather goes from a soften state to pyrolysis. However, at about 200° C. when the polymer is soft but still chemically intact, the aluminum hydroxide begins to decompose and this decomposition increases in intensity until the temperature reaches about 300° C., at which point the decomposition is complete and the residue includes significant amounts of $Al_2O_3$ (note: 1 kg of aluminum trihydrate gives 365 g of water. For instance 1 kg of a preferred composition of this invention develops 252 g of water). During this transformation the rapid evolution of water vapor produces a foaming of the polymer matrix. The calcium and/or magnesium carbonates together with the aluminum oxide residue are dispersed in the resulting foamed polymer matrix.

The fire or flame barrier material at this point is observed to have a cellular structure characterized by a low thermal conductivity, but it is still a polymer matrix. On further heating the carbonates are transformed into their oxides and the result is an essentially inorganic cellular structure comprising a combination of calcium, magnesium and aluminum oxides. A surprising and remarkable feature of the present invention is that this cellular structure exhibits sufficient mechanical integrity so as to be self-supporting and to be sufficiently resistant to moderate mechanical attack, particularly as it is believed that the polymer and even the carbon content of the barrier material at these elevated temperatures are pyrolyzed to, for instance CO and $CO_2$. Thus, at the surface of the fire or flame barrier material exposed or in contact with the high temperatures, such as are encountered in a fire, the decomposition of the aluminum hydroxide produces an endothermic effect. The endothermic heat by decomposition is 300 KJ/mol $Al_2O_3$ in accordance with the following reaction $2 Al(OH)_3 \rightarrow Al_2O_3 + 3H_2O$, and thus limits the temperature rise as long as all the aluminum hydroxide is not decomposed.

Moreover, the vapor formation foams the polymer matrix thereby reducing substantially its thermal conductivity. Both effects combine to reduce the heat flow rate to the underlying softening polymer material.

Thus, as indicated above, on heating the fire or flame barrier material of the present invention at an appropriate elevated temperature, an intumescent layer is formed close to the heat source while the portion of the material more remote from the heat source undergoes only the aforementioned endothermic reaction and does not advance to the intumescent stage.

The fire or flame barrier material of the present invention, is free of halogens, sulfur, phosphorus and other components that give off acidic products during a fire.

Moreover, dense smoke generation from the material of the present invention can hardly be observed during fire exposure. Rather, a low amount of a light gray smoke is observed during a fire. Smoke level, measured in Arapahoe equipment (gravimetric method) showed less than 0.5 wt % smoke of burned material, which confirms essentially a non-dense smoke generation during a fire.

The fire or flame barrier material of the present invention can be rigid or flexible to a certain extent (at least 20% elongation at break). It can also be laminated or reinforced with conventional materials.

The fire or flame barrier material of the present invention is usefully employed, for instance, in the production of walls, floors, ceilings, rooms and cabins where fire protection is required or desired. It can also be employed as a protective covering or coating for mechanical and electrical equipment such as electrical cabinets or housings, fittings, pipes, hoses, cables, panels, cable transits, doors and hatches. Moreover, it is usefully employed in the production of coverings for tanks and pipes, housing or carrying explosive contents and found in chemical plants, refineries, vehicles, ships and aircraft. Moreover, the fire or flame barrier material can be provided in granular form of any desired shape or dimension and can be employed as an insulating material between an inner and an outer surface of a storage unit, such as a storage tank or vessel, especially those of a large size. Because of its granular form, the fire or flame barrier material of the present invention can easily fill the space between said surfaces, thereby providing desirable insulation means. During a fire these granules, on exposure to elevated temperatures, provide a heat barrier effect as described above. Because of the loose storage or packing of the granules in the space between said surfaces, the granules expand and fuse together so as to ultimately form a firm, intumescent intermediate layer without imparting undue or deleterious pressure on said surfaces.

DETAILED DESCRIPTION OF THE INVENTION

The fire or flame barrier material of the present invention comprises 60-100 parts by weight of an ethylene copolymer; 0-40 parts by weight of an elasticizer such as EPDM rubber; 0-10 parts by weight of a polymer softening agent such as polyisobutylene; 0-15 parts by weight of a lubricating agent such as a paraffin wax; 0-15 parts by weight of calcium oxide; 50-450 parts by weight of aluminum hydroxide; 150-600 parts by weight of calcium carbonate or calcium-magnesium carbonate and if desired an effective amount of a coloring agent, such as carbon black, for instance about 1 part by weight.

The ethylene copolymer can be selected from the group consisting of ethylene-vinylacetate; ethylene-acrylic acid; ethylene-methacrylic acid; ethylene-ethyl acrylate; ethylene-vinyl acetate-methacrylic acid; ethylene-isobutyl acrylate; ethylene-methyl methacrylate and ethylene-vinyl acetate-carbon monoxide. Ethylene-ethyl acrylate is preferred.

In one embodiment of the present invention the fire or flame barrier material can be rigid. The rigid version of the fire or flame barrier material has successfully been tested and evaluated as fire resistant seal material for cable penetrations and as fire insulating material for steel constructions. In this embodiment the material comprises, preferably 100 parts by weight of ethylene copolymer, preferably ethylene-ethyl acrylate, 220 parts by weight of aluminum hydroxide, 220 parts by weight of a member selected from the group consisting of calcium carbonate and calcium-magnesium carbonate, 10 parts by weight of a paraffin wax lubricating agent, 11 parts by weight of an elasticizer such as EPDM rubber, 11 parts by weight of calcium oxide and 1 part by weight of carbon black. A preferred form of this material is hereinafter referred to as Product P.

In another embodiment of the present invention, the fire or flame barrier material can be somewhat flexible. In this embodiment the material comprises 80 parts by weight of ethylene-copolymer, preferably ethylene-ethyl acrylate, 150 parts by weight of aluminum hydroxide, 150 parts by weight of a member selected from the group consisting of calcium carbonate and calcium-magnesium carbonate, 10 parts by weight of paraffin wax as a lubricating agent, 30 parts by weight of an elasticizer such as EPDM rubber, 11 parts by weight of calcium oxide, 1 part by weight of a coloring agent such as carbon black and 10 parts by weight of a polymer softener such as polyisobutylene. A preferred form of this material is hereinafter referred to as Product C.

When the fire or flame barrier material of the present invention is used for the production of fire resistant cable transits it will expand due to the pressure therein of aluminum hydroxide, under the influence of intense heat, for example, fire or radiated heat, such that the material blocks any permeation of smoke, warm gases and flames along the transits.

At temperatures above the combustion temperature of the organic components, e.g., in a fire situation, the fire or flame barrier material of the present invention, as indicated previously, forms a strong intumescent layer having good thermal insulation properties and high thermal stability, i.e., it wll withstand heat up to temperatures of at least 1100° C. The intumescent layer contributes to an effective thermal and mechanical insulation of the particles or objects coated or covered with the fire or flame barrier material of this invention.

Before burning, the fire or flame barrier material of this invention is elastic and is very resistant to vibrations and mechanical loads.

The fire or flame barrier material of the present invention can also be formulated into a composition for coating or painting the object to be protected from fire. Thus, it can be present as a suspension of particulate matter in an alkyd, polyurethane, vinyl acetate or acrylate coating or paint vehicle.

The present invention also relates to a method for producing the fire or flame barrier material defined above, said process comprising mixing the components thereof, dry, at ambient temperature, extruding the resulting admixture at a fusion temperature of about 150-200° C. to form extrudates in continuous form and subdividing said extrudates. Conventional processing equipment, such as extruders and molding equipment can be utilized to process the material of the present invention.

The extrudates in continuous form, e.g. string-like form, can be cut into smaller lengths or cubes for temporary storage. These subdivided extrudates can then be extruded at a temperature of about 150° C. so as to produce covers for the articles or objects to be protected from fire or they can be employed as an insulator.

Moreover, the flame or fire barrier material of the present invention can easily be extruded to form coatings for cables which are exposed, or more importantly, for cables hidden in walls.

Tests made with the flame or fire barrier material of the present invention, used as fire stop material in cable penetrations, show that, for a class A fire test, the material withstood fire for 180 minutes, at which point the test was stopped. At this fire exposure, only approximately 1 inch of a 6 inch penetration or fire stop was decomposed. By comparison, known PVC materials under essentially the same class A fire test conditions withstood fire for only about 60 minutes at which point the PVC material completely decomposed and produced dangerous chlorine gas.

The flame or fire barrier material of the present invention can also be prepared by mixing together the components thereof, essentially in powder form to produce a loose admixture. The resulting dry mixture can then be extruded through a double screw extruder at a temperature of approximately 130° C. The resulting extrudate is partially cooled and fed through a perforated plate to be chopped into granular form at the exit of the plate. The granules can be stored temporarily at room temperature. Thereafter the granules can be used as insulation means or processed into pipe or conduit form through an extruder with gradual heating up to approximately 150° C.

The extruded conduit can be provided with a reinforcing means such as metal braiding or a coating, and optionally an outer protective cover, made of, for instance, a plastic material.

A conduit made of the flame or fire barrier material reinforced in this manner is especially useful as a flame-resistant shell for electric cables.

The reinforced conduit described above, forms, when exposed to fire conditions, a strong intumescent layer having good thermal insulation properties and high thermal stability. The intumescent layer contributes to an effective thermal and mechanical insulation of the cables housed therein. The intumescent layer is supported by the reinforcing coating.

As an example of a flame or fire barrier material of the present invention, produced especially in the form of a conduit for protecting electric cables, the following components were mixed together at a temperature of about 30° C., the components being essentially in powder form: 80 parts by weight of ethylene-ethyl acrylate copolymer, 30 parts by weight of a synthetic rubber such as EPDM rubber, 10 parts by weight of polyisobutylene, 10 parts by weight of paraffin wax, 11 parts by weight of calcium oxide, 1 part by weight of carbon black, 150 parts by weight of aluminum hydroxide and 150 parts by weight calcium carbonate. The resulting dry mixture is then fed through a double screw extruder at a temperature of 130° C., and the extrudate, in partially cooled condition, is then fed through a perforated plate and chopped into granular form at the exit from the plate.

The resulting granules can be stored, if necessary, at normal room temperature for later use, or they can be led directly to an extruder with gradual heating to approximately 150° C. for extruding into pipe or conduit form.

The extruded conduit is provided with an outer reinforcement after which, the reinforced conduit is covered with an outer protective coating of, for example, polyvinylchloride, if desired.

The polymeric matrix material, i.e. ethylene-ethyl acrylate copolymer and the synthetic rubber form the elasticizer components of the resulting conduit, and the relative amounts of these two components can be balanced depending on the degree of elasticity desired relative to the amount of filler material which is to be absorbed in the polymeric mixture. Polyisobutylene is added as an aid in the process of mixing the filler material in the polymeric mixture, and paraffin wax is added as a lubricating agent to give the mixture sufficient pliability during the manufacturing process.

Calcium oxide, which absorbs moisture in the mixture is added in suitable quantities as a drying agent to reduce the danger of pore effects when the polymeric materials and the various additives are mixed. The calcium oxide also contributes to a more homogeneous mass.

Carbon black is employed as a coloring agent. It also imparts to the mixture a certain degree of protection against oxidation.

The aluminum hydroxide and calcium carbonate, when the material of the invention is exposed to combustion conditions, produce a porous material which does not burn, and the mutual relationship between the additives gives the correct consistency to the foam which occurs on combustion. This foam later is transformed to a strong intumescent organic and inorganic layer having good thermal insulation properties and high thermal stability.

The pipe or conduit shaped protective article of the present invention provides good mechanical protection under normal conditions of use and does not produce halogen gases or appreciable smoke upon combustion. Apart from the organic materials, the protective conduit of the present invention does not burn easily and at high temperatures it forms a thermally stable, ceramic-like foam, organic and inorganic intumescent layer which has good thermal insulating properties, and which is held in place with the aid of reinforcement means such as a braiding of metal or other conventional material.

Under combustion conditions the chemical reaction produces water which as noted earlier has a delayed heat increase or heat rise. The material of the present invention also has a low heat of combustion, approximately 10 MJ/kg. The protective conduit of this invention can be made using standard equipment, and is relatively inexpensive due to easily available raw materials.

Typical of the materials of the present invention are those having the following characteristics:

| | | |
|---|---|---|
| Tensile strength, (MPa) | 10.3 | 6.9 |
| Elongation of break, (%) | 7 | 23 |
| Density, virgin material, (kg/m³) | 1840 | 1640 |
| Density, charred material, (kg/m³) | 490 | 330 |
| Glow loss/1000° C./hr, (wt %) | 50 | 56 |
| Smoke density generation, Arapahoe, (wt %) | 0.5 | 0.5 |
| Oxygen index, (% O$_2$) | >37 | >30 |
| Combustion energy (MJ/kg) | 9 | 12 |
| Energy consumption, 200-300° C., (MJ/kg) | 0.43 | 0.38 |
| Thermal conductivity | | |
| virgin material - 20° C., (W/m° K.) | 0.69 | — |
| char material - 20° C., (W/m° K.) | 0.07 | — |
| char material - 20-1000° C (W/m° K.) | 0.06 | 0.06 |
| Thermal resistivity | | |
| virgin sheet - 9.2 mm, (2 K/W) | 0.0133 | — |
| charred sheet - 9.2 mm, (2 K/W) | 0.244 | — |
| Volume expansion at 200-300° C. (Volume %) | 100 | 200 |
| Electrical volume resistance (ohm-cm) | 2.7-1.0" | 2.7-10" |
| Halogen content (wt %) | 0 | 0 |
| Water resistance | Excellent | Excellent |
| Oil resistance | Good | Good |
| Weight content of fillers, (wt %) | 79 | 70 |

The material of the present invention has also been subjected to fire tests. Typical of such tests are the following.

A 6' long, 5' wide and 4' high brick cabinet or furnace was constructed. Draft slots are provided at the bottom of the cabinet. The heat source is a huge propane burner located at the bottom and in the center of the cabinet. Also centered within the cabinet is a steel cable mounted horizontally.

The test samples are placed on the ladder running through the cabinet in 6 ft lengths. The cabinet, or furnace, is pre-heated to expel any moisture in the bricks and cabinet itself in order to prevent artificial cooling by the moisture.

The cabinet is then cooled for a time just sufficient to place therein the sample cables protected with the heat barrier material of the present invention and to connect the 110 volt power lines and thermocouples.

During the test, the thermocouples measure the flame/fire temperatures at four selected locations in the fire so as to provide continuous temperature readouts. The average temperature within the cabinet is maintained at or about 2000° F. by adjusting the amount of injected propane fuel into the cabinet.

The temperature within the cabinet reaches this 2,000° F. level within about 2-4 minutes from the time of fuel ignition and actual start of the test timing. The test monitors temperature (with recording), circuit integrity of each individual conductor powered by 110 v, time elapsed from ignition and fuel injection. The test terminates when one or more circuits short and the timer is automatically stopped. Time elapsed with full circuit integrity represents the critical performance.

The test was carried out twice at ambient temperature of 90° F., 50-60% relative humidity with a variable wind velocity of less than 15 mph.

The test sample cable was a 3 conductor (0.5 cm$_2$) 12 AWG Flex-Flame BU cable loosely enclosed by a tubing made from the material of the present invention.

The first test lasted 18½ minutes while the second test lasted 20⅓ minutes. The results were impressively consistent and passed the pre-selected 15 minute circuit integrity time requirement.

Cables of larger sizes, such as 3×16 mm², similarly protected with the material of the present invention were also tested in essentially the same fashion. Equally favorable results were achieved as indicated by a circuit integrity time of more than 16 minutes.

In a somewhat similar second fire test a cabinet or furnace measuring 5 m long, 4 m wide and 1m high was constructed. A fuel pit was provided underneath the cabinet as were air inlets in the lower part of the cabinet walls.

The cable samples provided with the protective material of the present invention were wrapped to steel beams and laid on top of the cabinet, the steel beams being supported at the mid portion thereof to prevent sag.

At the beginning of the test the fuel employed was a mixture of diesel fuel and gasoline. Thereafter only pure diesel fuel was employed. The temperature within the cabinet rose to 1800° F. one minute after ignition and reached a temperature of 2000° F. five minutes after ignition.

The cable samples tested were 2×2.5 mm² BU cables protected within a tubing made of the material of the present invention. The BU cable consisted of tinned seven strand copper wrapped with mica tape, insulated with EPDM and jacketed with a halogen-free Vamac base elastomer.

The samples tested provided circuit integrity times of 14.23, 14.41, 16.58 and 16.58 minutes which times were significantly greater than times achieved using mineral insulated cables and the like, which times ranged from 6½ to 8½ minutes.

The material of the present invention has also successfully passed the IEEE 645-1978 test (IEEE Standard Cable Penetration Fire Stop Qualification Test). This test showed that the material of the present invention swelled, sintered and formed complete fire and smoke tight penetration and which functioned for burn times longer than 180 minutes. Because of convincing fire barrier properties of the material of the present invention, this material is usefully employed as a fire insulating material for steel constructions.

Steel tubes were insulated with known fire insulating materials including mineral fiber mats, ceramic fiber mats, gypsum, magnesium-oxychloride cement, mica-Portland cement, intumescent cladding and intumescent paint.

Similarly steel tubes and an H-beam were insulated with the material of the present invention.

The thus insulated steel tubes and H-beams were exposed to ISO and hydrocarbon fire time-temperatures ranging up to 1100° C. and up to 180 minutes.

The results showed that the material of the present invention at thickness of 2.5 and 9 mm, formed crack-free and excellent thermal insulating sintered char which maintained its mechanical strength and did not degrade even after 2 hours of testing. However, others of the materials tested showed cracking and melting. The steel beam insulated with the material passed the H-60 test.

As indicated above, the flame barrier materials of the present invention, when used as insulation materials are of great importance for the protection of electric cable from fire.

The following study has been carried out so as to characterize changes in the structure of flame barrier materials of the present invention under different conditions of temperature.

Three samples were studied: (1) Product P, defined above; (2) Product C, also defined above; and (3) Product A, a material in accordance with the present invention, but based on another copolymer within the same family. Product A, like Products P and C, is a highly filled polymer based composite whose main components are an ethylene copolymer, calcium carbonate, $CaCO_3$, and aluminum hydroxide, $Al(OH)_3$.

In a first phase of this study, thermogravimetric experiments, TG, and differential thermal analysis, DTA, were carried out with a Mettler automatic recording thermo-analyser.

For DTA measurements, $Al_2O_3$ calcinated at 1300° C. was applied as a reference material. The incoming gas, nitrogen or oxygen, was adjusted to a flow rate of five liters per hour. The gas was dried by passing through silicagel columns before introduction into the furnace.

From a sample sheet material of 3 mm thickness, discs of 3 mm diameter were cut out and weighed. Two discs weighing about 60 mg were placed into a platinum crucible on the one side of the PtRh 10%-Pt thermocouple. The other crucible of the thermocouple was filled with the $Al_2O_3$ reference material. The automatically controlled heating rate was 25° C. per minute. Simultaneous TG/DTA and temperature curves were recorded with a chart speed of 12 inches per hour.

The gases evolved during thermal analysis were sampled discontinuously and analyzed by mass spectrometry. Glass sampling bulbs (250 ml) were used and fitted with Teflon stopcocks and cylindrical septa (Supelco Inc. Bellefonte, PA) for the collection of evolved gases. These bulbs, with opened stopcocks, were connected during the temperature changes indicated in Table 1 below to the gas outlet of the Mettler DTA apparatus and the evolved gases, diluted in nitrogen or oxygen streamed through the bulb at a flowrate of 5 l/hour. As soon as the upper temperature of the indicated temperature range was reached, the stopcocks were closed and the bulb was disconnected from the DTA apparatus. 5.0 ml of the gas sample were withdrawn from the bulb through the septum with a 5 ml Precision Sampling Syringe fitted with a Minimert valve (Kontron AG, Zurich) and introduced into the pre-evacuated heated reservoir of the mass spectrometer. By opening a MV38 valve (A.E.I. Scientific Ltd, Harlow, Essex) a continuous gas flow was maintained from the reservoir into the source of the mass spectrometer and the spectra were recorded immediately.

A double-focusing A.E.I. MS30 mass spectrometer with electron-impact ionization was used. The source temperature was 150° C. The source pressure varied from $3.10^{-6}$ to $1.10^{-5}$ torr. The electron energy was 70 eV and the accelerating voltage was 4 kV. The spectra were recorded on a Bryans Southern Series 10-4306 Ultraviolet Oscillograph, using 30 sec/decade scan speed.

From each mass spectrum, obtained with different collector sensitivities, the corresponding background spectrum was substracted.

TABLE 1

Summary Of Evolved Gas Analysis By Mass Spectrometry

| Heated Material | Atmosphere | Temperature range (°C.) | Gases found |
|---|---|---|---|
| Product C | $N_2$ | 240–450 | $H_2O$ |
| | | 440–550 | $C_4H_8 \cdot C_5H_{10}$ |
| | | 725–950 | $CO_2$ |
| | $O_2$ | 200–400 | $CO, H_2O$ |
| | | 500–700 | $CO_2$ |
| | | 725–1000 | $CO_2$ |
| Product P | $N_2$ | 200–400 | $CH_4, CO$ |
| | | 400–600 | $CH_4, C_2H_6, CO^*$ |
| | | 750–950 | $CO$, much $CO_2$ |
| | $O_2$ | 200–460 | $H_2O, CO, CO_2, C_3H_8$ |
| | | 500–700 | $H_2O, CO, CO_2$ |
| | | 725–1000 | $H_2O, CO, CO_2$ |
| Product A | $N_2$ | 240–450 | $C_2H_6$ |
| | | 450–550 | unsaturated aliphatic hydrocarbons $C_nH_{2n-2}^{**}$ |
| | | 725–950 | $CO_2$ |
| | $O_2$ | 240–450 | $H_2O, CO_2$ |
| | | 730–950 | $H_2O, CO_2$ |

*during the DTA analysis waxy material condensed on the outlet tube of the furnace: the mass spectrum of this material showed that it is like polyethylene
**white smoke appeared in the gas collection bulb.

Thermal stability tests of Products P, C and A were carried out using the system schematically represented in FIG. 1. Each thermal treatment is carried out simultaneously on the three samples (Product P, Product C and Product A) in order to give a better comparison.

Each sample was supported by a stainless steel plate (6×6×1mm). After treatment, the samples were cooled down to room temperature.

The thermal stability tests were carried out as follows:
(1) Fast Heating Rate in Nitrogen-the three samples were introduced directly in the hot section of the furnace;
(2) Fast Heating Rate in Air-same conditions; and
(3) Slow Heating Rate in Nitrogen-the three samples were introduced into the central section of the furnace at room temperature and the heating then started.

For each test the heating rate is reported as °C./sec for the fast heating rate and as °C./60 sec for the slow heating rate. The increase of the temperature was measured using a chromel/alumel thermocouple set below the sample support. It is important to note that the heating is carried out mainly by radiation. This means that the temperature of the surface of the sample can be higher than the temperature of the sample itself. For each sample the weight decrease was measured.

The results of the above tests are discussed below.

The thermograms of samples under dynamic nitrogen atmosphere are shown in FIG. 2. A decomposition in three steps can be observed. The first started at about 245° C. (290° C. for Product A) and was accompanied by an intense endothermic effect. This step is attributed to the decomposition of $Al(OH)_3$ and loss of water.

The second, which begins at 415° C., is accompanied by a small endothermic effect. This step ended at 560° C. The weight loss of this is caused by the volatilization of polyethylene. The vapors were transported with the nitrogen flow and condensed in the gas outlet tubing. The condensed material was identified by IR and mass spectrometry as low molecular weight polyethylene.

The last step began at 730° C. and ended at 945°–955° C. It was also accompanied with an endothermic effect. The weight loss of this step is attributed to decomposition of $CaCO_3$ with elimination of $CO_2$.

The thermograms of samples obtained under dynamic oxygen atmosphere are shown in FIG. 3.

Under these conditions only two steps of weight loss were observed.

The first one started at about 230° C. and ended at 380° C. (440° C. for Product A). This weight loss under oxygen atmosphere corresponds to the sum of steps 1 and 2 under nitrogen atmosphere and are attributed to the decomposition of $Al(OH)_3$ and burning of polyethylene, in the same time.

The second step began at 730° C. and was accompanied with an endothermic effect. This is similar to the step 3 obtained under nitrogen atmosphere. It is caused by the decomposition of $CaCO_3$.

The summary of the TG measurements are presented in Table 2, below.

TABLE 2

Characteristics Of Thermal Degradation Of Samples

| Product | Atmosphere | Temperature range (°C.) | Loss of weight (%) |
|---|---|---|---|
| Product P | $N_2$ | 245–415 | 13.3 |
| | | 415–560 | 22.1 |
| | | 730–955 | 15.8 |
| | $O_2$ | 230–380 | 35.9 |
| | | 730–995 | 15.8 |
| Product C | $N_2$ | 245–415 | 12.7 |
| | | 415–560 | 27.2 |
| | | 730–945 | 15.3 |
| | $O_2$ | 230–380 | 39.9 |
| | | 730–970 | 15.3 |
| Product A | $N_2$ | 290–415 | 20.6 |
| | | 415–560 | 22.2 |
| | | 730–930 | 15.2 |
| | $O_2$ | 230–440 | 41.5 |
| | | 730–930 | 15.1 |

The DTA thermograms obtained under dynamic nitrogen atmosphere are given in FIG. 4.

The explanation of the most important thermal effects are the following.

A mild endothermal effect observed at about 100° C. is caused probably by a second-order transition of the plastic material. This one is followed by another more pronounced endothermal peak at approximately 352° C. It is attributed to decomposition of $Al(OH)_3$ and loss of water.

At 415°–455° C. only the Product P and C samples gave an endothermal peak, caused probably by a melting transition of the polyethylene.

All samples showed a little endotherm at 450°–500° C. results from the vaporization of polyethylene.

The endothermal effects between 730° C.–940° C. are indicative of $CO_2$ formation by the decomposition of $CaCO_3$.

The DTA thermograms obtained in dynamic oxygen atmosphere (FIG. 5) showed the same profiles as in nitrogen with the exception of the step at 250°–400° C. At this temperature two phenomena occurred simultaneously: the endothermal dehydration of $Al(OH)_3$ and the burning of plastic material with a very intense exothermal effect which perturbed the linearity of the heating.

The thermal effects developed during the DTA is shown in Table 3, below.

TABLE 3

Characteristics of DTA of Samples

| Product | Atmosphere | Temperature range (°C.) | Thermal effect | Phenomena |
|---|---|---|---|---|
| Product P | $N_2$ | 75–120 | endo | Glass transition of PE |
| | | 245–415 | " | $Al(OH)_3$ decomposition |
| | | 420–480 | " | Polyethylene (PE) melting |
| | | 480–580 | " | PE vaporization |
| | | 740–940 | " | $CaCO_3$ decomposition |
| | $O_2$ | 80–130 | endo | Glass transition of PE |
| | | 230–390 | " | $Al(OH)_3$ decomposition |
| | | 330–360 | exo* | PE burning |
| | | 730–940 | endo | $CaCO_3$ decomposition |
| Product C | $N_2$ | 75–120 | endo | Glass transition of PE |
| | | 245–390 | " | $Al(OH)_3$ decomposition |
| | | 390–440 | " | PE melting |
| | | 440–580 | " | PE vaporization |
| | | 740–940 | " | $CaCO_3$ decomposition |
| | $O_2$ | 80–130 | endo | Glass transition of PE |
| | | 230–320 | exo | PE crystallization |
| | | 300–390 | endo | $Al(OH)_3$ decomposition |
| | | 330–370 | exo* | PE burning |
| | | 735–945 | endo | $CaCO_3$ decomposition |
| Product A | $N_2$ | 90–120 | endo | Glass transition of PE |
| | | 290–415 | " | $Al(OH)_3$ decomposition |
| | | 450–550 | " | PE vaporization |
| | | 730–910 | " | $CaCO_3$ decomposition |
| | $O_2$ | 90–110 | endo | Glass transition of PE |
| | | 250–320 | exo | PE crystallization |
| | | 280–440 | endo | $Al(OH)_3$ decomposition |
| | | 350–415 | exo* | PE burning |
| | | 730–885 | endo | $CaCO_3$ decomposition |

*this exotherm effect occurred during the endotherm effect of $Al(OH)_3$ decomposition Table 1, above, summarizes the results obtained in the qualitative analysis of the evolved gases.

At 700° C., $CaCO_3$ is the unique crystalline phase for the Product P and the main phase for the Products C and A. Few additional diffraction lines have been observed in the products C and A with a very small peak intensity. These unidentified diffraction lines were the following:

| Product C | — | 2.40 Å | 2.04 Å | 1.70 Å |
|---|---|---|---|---|
| Product A | 2.89 Å | — | 2.04 Å | — |

At this temperature the thermal decomposition of $Al_2O_3.3H_2O$ with the formation of γ-alumina (AlOOH) and $Al_2O_3$ can be expected. As no line has been observed on the diffraction diagram, the aluminium based inorganic phases are probably amorphous.

At 1200° C. with a fast heating rate in air, the phases which are observed are the following:

| Product P | $CaCO_3$ main phase |
| | CaO, $Al_2O_3$ |
| | 3 CaO, $Al_2O_3$ |
| Product C | $CaCO_3$ main phase |
| | CaO, $Al_2O_3$ |
| | 3 CaO, $Al_2O_3$ |
| Product A | $CaCO_3$ main phase |
| | 3 CaO, $Al_2O_3$ |
| | 12 CaO, 7 $Al_2O_3$ |

This means that due to the high heating rate the thermal decomposition of $CaCO_3$ is not completed. This results from the low heat transfer into the material.

At 1100° C. with a slow heating rate and 12 hours annealing the following phases have been observed.

| Product P | 12 CaO, 7 $Al_2O_3$ main phase |
| --- | --- |
|  | CaO, $Al_2O_3$ |
| Product C | 12 CaO, 7 $Al_2O_3$ main phase |
|  | CaO, $Al_2O_3$ |
| Product A | CaO, $Al_2O_3$ main phase |
|  | 12 CaO, 7 $Al_2O_3$ |
|  | AlOOH traces |
|  | $CaCO_3$ traces |

The three samples differ clearly from the point of view of their morphology. A laminar structure is observed for Products P and C while a more isotropic structure is observed for Product A. The non-laminar structure of product A is related to the fact that such a product is expected to be shaped by direct casting of a homogeneous mixture. The laminar structure of Products P and C is such that lateral exudation of the organic phase is observed below 400° C. Products P and C are superior regarding intumescence.

At elevated temperature (>800° C.) the three products differ by nature of the mineral phase. $Al_2O_3$, resulting from the decomposition of $Al_2O_3.3H_2O$ reacts with CaO resulting from the thermal decomposition of $CaCO_3$.

The rate of mineralization (formation of CaO—$Al_2O_3$ compounds) is higher for the Products P and C than for the Product A. Such differences can result either from the characteristics of the raw materials and more precisely from their refractoricity and particle size.

What is claimed is:

1. A fire or flame barrier material consisting essentially of 60-100 parts by weight of an ethylene copolymer matrix, 50-450 parts by weight of aluminum hydroxide and 150-600 parts by weight of a member selected from the group consisting of calcium carbonate and calcium-magnesium carbonate.

2. The fire or flame barrier material of claim 1 which also includes 11-30 parts by weight of an elasticizer, 0-10 parts by weight of a polymer softening agent, 8-15 parts by weight of a lubricating agent, 8-15 parts by weight of calcuim oxide and 1 part by weight of a coloring agent.

3. The fire or flame barrier material of claim 2 wherein said lubricating agent comprises paraffin wax.

4. The fire or flame barrier material of claim 2 wherein said elasticizer comprises ethylene propene rubber.

5. The fire or flame barrier material of claim 2 wherein said color-aging agent comprises carbon black.

6. The fire or flame barrier material of claim 2 which also includes an antioxidant agent comprising poly trimethyl dihydroquinoline present in an amount of about 1.5 parts by weight per 100 parts of said copolymer.

7. The fire or flame barrier material of claim 1 in the form of a coating or painting composition.

8. The fire or flame barrier material of claim 1 wherein said ethylene copolymer is selected from the group consisting of ethylene-vinylacetate, ethylene-acrylic acid, ethylene methacrylic acid, ethylene-ethylacrylate, ethylene-vinylacetate-methacrylic acid, ethylene-isobutyl acrylate, ethylene-methyl methacrylate and ethylene-vinyl acetate-carbon monoxide.

9. The fire or flame barrier material of claim 1 wherein said ethylene copolymer is ethylene-ethyl acrylate.

10. A rigid fire or flame barrier material consisting essentially of 100 parts of ethylene-ethyl acrylate, 220 parts by weight of aluminum hydroxide, 220 parts by weight of calcium carbonate, 10 parts by weight of a lubricant, 11 parts by weight of an elasticizer, 11 parts by weight of calcium oxide and 1 part by weight of a coloring agent.

11. A flexible fire or flame barrier material consisting essentially of 80 parts by weight of ethylene-ethyl acrylate, 150 parts by weight of aluminum hydroxide, 150 parts by weight of calcium carbonate, 10 parts by weight of a lubricant, 30 parts by weight of an elasticizer, 11 parts by weight of calcium oxide, 10 parts by weight of a polymer softening agent and 1 part by weight of a coloring agent.

12. A fire or flame barrier material, in the form of a conduit for protecting electrical cables, comprising 80-100 parts by weight of ethylene-ethyl acrylate polymer, 150-220 parts by weight of aluminum hydroxide, 150-220 parts by weight of a member selected from the group consisting of calcium carbonate and calcium-magnesium carbonate, 11-30 parts by weight of an elasticizer, 0-10 parts by weight of a polymer softening agent, 10 parts by weight of a lubricating agent, 11 parts by weight of calcium oxide and 1 part by weight of a coloring agent.

13. The fire or flame barrier material of claim 1 in sub-divided extrudate form.

14. The fire or flame barrier material of claim 1 in granular form.

15. The fire or flame barrier material of claim 1 in extruded tube form.

16. The extruded fire or flame barrier material in tube form of claim 15 provided with an external steel brading and an outer protective coating.

17. The extruded fire or flame resistant material of claim 16 wherein the outer protective coating is a plastic material.

* * * * *